US009684812B2

(12) United States Patent
Riedijk et al.

(10) Patent No.: US 9,684,812 B2
(45) Date of Patent: Jun. 20, 2017

(54) FINGERPRINT SENSING DEVICE WITH COMMON MODE SUPPRESSION

(71) Applicant: Fingerprint Cards AB, Göteborg (SE)

(72) Inventors: Frank Robert Riedijk, Delft (NL); Klaas-Jan de Lange, Nijmegen (NL)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/168,671

(22) Filed: May 31, 2016

(65) Prior Publication Data

US 2017/0091509 A1 Mar. 30, 2017

(30) Foreign Application Priority Data

Sep. 29, 2015 (SE) ...................................... 1551242

(51) Int. Cl.
*G06K 9/00* (2006.01)
(52) U.S. Cl.
CPC .................. *G06K 9/0002* (2013.01)
(58) Field of Classification Search
None
See application file for complete search history.

(56) References Cited

U.S. PATENT DOCUMENTS

| 7,864,992 B2 | 1/2011 | Riedijk et al. | |
|---|---|---|---|
| 2003/0028811 A1* | 2/2003 | Walker | G07C 9/00158 726/5 |
| 2008/0069413 A1* | 3/2008 | Riedijk | G06K 9/0002 382/124 |
| 2015/0009186 A1* | 1/2015 | Landy | G06K 9/0002 345/178 |

OTHER PUBLICATIONS

Kim, S. et al., "A CMOS Fingerprint System-on-a-Chip With Adaptable Pixel Networks and Column-Parallel Processors for Image Enhancement and Recognition," IEEE Journal of Solid-State Circuits, vol. 43, No. 11, Nov. 2008, pp. 2558-2567.

* cited by examiner

*Primary Examiner* — Jason Heidemann
*Assistant Examiner* — Brian Shin
(74) *Attorney, Agent, or Firm* — Remarck Law Group PLC (57) ABSTRACT

The present invention relates to a fingerprint sensing device for sensing a fingerprint pattern of a finger, the fingerprint sensing device comprising at least a first sensing structure and a second sensing structure; and at least a first charge amplifier and a second charge amplifier. Each charge amplifier comprises: a first input; a second input; an output; and at least one amplifier stage between the first and second inputs, and the output. The output is capacitively coupled to the first input. The first input of the first charge amplifier is connected to the first sensing structure; the first input of the second charge amplifier is connected to the second sensing structure; and the output of the first charge amplifier is capacitively coupled to the first input of the second charge amplifier to suppress the common mode component.

15 Claims, 9 Drawing Sheets

FINGERPRINT SENSING DEVICE WITH COMMON MODE SUPPRESSION

CROSS REFERENCE TO RELATED APPLICATIONS

This application claims the benefit of Swedish Patent Application No. 1551242-9 filed Sep. 29, 2015. The disclosure of the above application is incorporated herein by reference in its entirety.

FIELD OF THE INVENTION

The present invention relates to a capacitive fingerprint sensing device and to a method of sensing a fingerprint pattern.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between each of several sensing structures and a finger placed on or moved across the surface of the fingerprint sensor.

Some capacitive fingerprint sensors passively read out the capacitance between the sensing structures and the finger. This, however, requires a relatively large capacitance between sensing structure and finger. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a capacitive fingerprint sensing system in which a driving signal is injected into the finger by pulsing a conductive structure arranged in the vicinity of the sensor array and measuring the resulting change of the charge carried by the sensing structures in the sensor array.

This type of so-called active capacitive fingerprint sensing systems generally enable measurement of the capacitance between finger and sensing structures with a much higher signal-to-noise ratio than the above-mentioned passive systems. This, in turn, allows for a considerably thicker protective coating and thus for more robust capacitive fingerprint sensors that can be included in items subjected to considerable wear, such as mobile phones.

For even further increased robustness and ease of integration of the fingerprint sensor into electronic devices etc., it is, however, desirable to enable fingerprint measurement through a very thick protective coating, which may be several hundreds of microns thick. For instance, it may be desirable to enable fingerprint measurement through a sheet of glass or similar, such as the front or back glass cover of a mobile phone.

When measuring through such a thick protective coating, however, the capacitive coupling between the finger and different sensing structures will be almost the same, making it very difficult to extract fingerprint information from the fingerprint sensor output. In other words, the portion of the input signal to the sensing structures carrying fingerprint information will be very small compared to the common input signal to the sensing structures.

To mitigate this problem, U.S. Pat. No. 8,888,004 proposes to apply an inverted version of the excitation signal or of the average of the received signal across the array of finger sensing pixels equally to the array of finger sensing pixels. In one implementation, U.S. Pat. No. 8,888,004 proposes to generate the average signal by interconnecting a group of finger sensing pixels that may not currently be scanned and measuring the average signal developed on this group of interconnected pixels.

Although the approach proposed by U.S. Pat. No. 8,888,004 may be potentially useful for suppressing the common signal, the suggested solution is expected to be rater complex and difficult to implement in practice.

SUMMARY OF THE INVENTION

In view of the above-mentioned and other drawbacks of the prior art, it is an object of the present invention to achieve an improved capacitive fingerprint sensing device, in particular a capacitive fingerprint sensing device providing for improved sensing performance through very thick protective coatings.

According to a first aspect of the present invention, it is therefore provided a fingerprint sensing device for sensing a fingerprint pattern of a finger, the fingerprint sensing device comprising: a plurality of electrically conductive sensing structures including at least a first sensing structure and a second sensing structure; and charge sensing circuitry connected to the sensing structures, the charge sensing circuitry including at least a first charge amplifier and a second charge amplifier, each comprising: a first input; a second input; an output; and at least one amplifier stage between the first and second inputs, and the output, the output being capacitively coupled to the first input, wherein: the first input of the first charge amplifier is connected to the first sensing structure; the first input of the second charge amplifier is connected to the second sensing structure; and the output of the first charge amplifier is capacitively coupled to the first input of the second charge amplifier.

The fingerprint sensing device may advantageously comprise a rather large number of sensing structures arranged in an array. For instance, the fingerprint sensing device may comprise at least one hundred, or even more advantageously at least one thousand, sensing structures, which may be arranged in a rectangular array. The pitch of the sensing structure array may, for example, be about 50 µm (corresponding to a resolution of 500 pixels per inch).

Moreover, each sensing structure may advantageously be provided in the form of a metal plate, so that a kind of parallel plate capacitor is formed by the sensing structure (the sensing plate), the local finger surface, and a protective coating provided between the sensing structures and the finger surface (and any air that may locally exist between the finger surface and the protective coating).

The protective coating, which may be included in the fingerprint sensing device, may advantageously be at least 20 µm thick and have a high dielectric strength to protect the underlying structures of the fingerprint sensing device from wear and tear as well as ESD. Even more advantageously, the protective coating may be at least 50 µm thick. In embodiments, the protective coating may be several hundred µm thick.

In a charge amplifier, the potential at the first input (often referred to as the 'negative' input) will follow the potential at the second input (often referred to as the 'positive' input). In other words, a change in the potential at the second input results in a substantially corresponding change in the potential at the first input. Depending on the actual configuration of the charge amplifier, the potential at the first input may be substantially the same as the potential at the second input, or there may be a substantially constant potential difference between the first and second inputs. If, for instance, the amplifier stage in the charge amplifier is a single stage amplifier with a single sense transistor, the potential difference may be the gate-source voltage of the sense transistor.

In the fingerprint sensor described in U.S. Pat. No. 7,864,992, the charge amplifier converts a change in a charge carried by the sensing structure (plate) connected to the first input to a change in a voltage at the output of the charge amplifier.

The above-mentioned change of the charge carried by a sensing structure may result from a change in the potential difference (voltage) between the finger and the sensing structure, and the magnitude of the change of the charge may depend upon the size of the change in potential difference and the capacitive coupling between the finger and the sensing structure.

In the case of a very thick protective coating (such as several hundred μm of glass), the capacitive coupling between the finger and the different sensing structures in the fingerprint sensing device may be very similar, so that the difference in the capacitive coupling for different sensing structures (the difference component) may be very small compared to the common capacitive coupling for the different sensing structures (the common mode component).

The present inventors have realized that, by capacitively coupling the output of the first charge amplifier to the first input of the second charge amplifier, a change in a voltage at the output of the second charge amplifier will be indicative of a difference between the change in charge carried by the second sensing structure and the change in charge carried by the first sensing structure.

Accordingly, through embodiments of the present invention, the change of the voltage at the output of the second charge amplifier can be made dependent on the difference in capacitive coupling between the first sensing structure and the finger and the capacitive coupling between the second sensing structure, and the common mode (CM) component can be suppressed.

Furthermore, through embodiments of the present invention, this effect can be achieved with simple and compact circuitry, and without the need for resistors, filters or additional signal generating circuitry.

To enable efficient use of all sensing structures, the output of the second charge amplifier may be capacitively coupled to the first input of the first charge amplifier. Hereby, a symmetrical circuit configuration is achieved in which the common mode component can be suppressed for each pixel (sensing structure and associated charge amplifier) in the fingerprint sensing device.

To provide for the desired operation of the fingerprint sensing device, with suppression of the common mode component and a suitable amplification of the difference component, a capacitive coupling between the output of the second charge amplifier and the first input of the second charge amplifier may be stronger than a capacitive coupling between the output of the first charge amplifier and the first input of the second charge amplifier; and a capacitive coupling between the output of the first charge amplifier and the first input of the first charge amplifier may be stronger than a capacitive coupling between the output of the second charge amplifier and the first input of the first charge amplifier.

Advantageously, the capacitive coupling between the output of the second charge amplifier and the first input of the second charge amplifier may be less than two times stronger than the capacitive coupling between the output of the first charge amplifier and the first input of the second charge amplifier; and the capacitive coupling between the output of the first charge amplifier and the first input of the first charge amplifier may be less than two times stronger than the capacitive coupling between the output of the second charge amplifier and the first input of the first charge amplifier.

According to various embodiments, furthermore, the output of the first charge amplifier may be capacitively coupled to the first input of the second charge amplifier by means of a conductive first charge amplifier output coupling structure directly conductively connected to the output of the first charge amplifier, a conductive second charge amplifier input coupling structure directly conductively connected to the first input of the second charge amplifier and a dielectric layer arranged between the first charge amplifier output coupling structure and the second charge amplifier input coupling structure; and the output of the second charge amplifier may be capacitively coupled to the first input of the first charge amplifier by means of a conductive second charge amplifier output coupling structure directly conductively connected to the output of the second charge amplifier, a conductive first charge amplifier input coupling structure directly conductively connected to the first input of the first charge amplifier and a dielectric layer arranged between the second charge amplifier output coupling structure and the first charge amplifier input coupling structure.

These embodiments provide for a simple circuit configuration, facilitating the design and manufacture of the fingerprint sensing device. This may be particularly important in embodiments where the fingerprint sensing device is formed on a semiconductor substrate using semiconductor fabrication processes. For instance, the fingerprint sensing device may advantageously be manufactured in a so-called CMOS-process.

Advantageously, first switching circuitry may be provided between the output of the first charge amplifier and the first charge amplifier output coupling structure, and second switching circuitry may be provided between the output of the second charge amplifier and the second charge amplifier output coupling structure. By using the first and second switching circuitry to disconnect the first charge amplifier output from the second charge amplifier input, and the second charge amplifier output from the first charge amplifier input, the fingerprint sensing device according to embodiments of the invention can conveniently be controlled between a 'CM-suppression' mode and a 'normal' mode. This may, for example, allow a single sensor component to be optimally tuned for different electrical thicknesses (depending on the physical thickness and the dielectric constant of the protective coating) of the protective coating. For a thin coating, the 'normal' mode may produce the best fingerprint images, and for a very thick coating, the 'CM-suppression' mode may produce the best fingerprint images.

The above-mentioned first charge amplifier input coupling structure may advantageously be constituted by the first sensing structure; and the above-mentioned second charge amplifier input coupling structure may advantageously be constituted by the second sensing structure.

In this configuration, the first sensing structure and the second structure may be formed in a first conductive layer, such as a metal layer, and the above-mentioned first and second charge amplifier output coupling structures may be formed in a second conductive layer, which may be underlying the first conductive layer. Accordingly, the same dielectric layer may separate the first sensing structure and the first charge amplifier output coupling structure, and the second sensing structure and the second charge amplifier output coupling structure, respectively.

According to various embodiments, furthermore, the first input of the first charge amplifier may be capacitively coupled to the output of the first charge amplifier by means of: a conductive first feedback structure directly conductively connected to the output of the first charge amplifier, the first sensing structure, and a dielectric layer arranged between the first feedback structure and the first sensing structure; and a conductive second feedback structure directly conductively connected to the output of the first charge amplifier, the first sensing structure, and a dielectric layer arranged between the second feedback structure and the first sensing structure; and the first input of the second charge amplifier may be capacitively coupled to the output of the second charge amplifier by means of: a conductive third feedback structure directly conductively connected to the output of the second charge amplifier, the second sensing structure, and a dielectric layer arranged between the third feedback structure and the second sensing structure; and a conductive fourth feedback structure directly conductively connected to the output of the second charge amplifier, the second sensing structure, and a dielectric layer arranged between the fourth feedback structure and the second sensing structure.

The functionality of the first and second feedback structures, and the third and fourth feedback structures, respectively, may be achieved with a single combined structure for each charge amplifier/pixel. By providing separate feedback structures, however, the fingerprint sensing device is expected to become less sensitive to variations in the manufacturing process.

According to various embodiments, the second feedback structure and the first charge amplifier output coupling structure may be formed by a first conductive structure extending partly below the first sensing structure and partly below the second sensing structure; and the fourth feedback structure and the second charge amplifier output coupling structure may be formed by a second conductive structure extending partly below the first sensing structure and partly below the second sensing structure.

In these configurations, fewer conductive structures and interconnects may need to be formed to achieve the desired functionality, which facilitates design and manufacturing of the fingerprint sensor. Further, the approach used in these embodiments facilitates capacitive cross-coupling with more than one neighboring pixel.

According to embodiments, the first charge amplifier output coupling structure may be designed to have substantially the same area as the above-mentioned third feedback structure, and the second charge amplifier output coupling structure may be designed to have substantially the same area as the above-mentioned first feedback structure. In particular, the different structures may be designed to be substantially identical in size and shape. Hereby, process variations etc. will influence the first charge amplifier output coupling structure and the third feedback structure, and the second charge amplifier output coupling structure and the first feedback structure, respectively, in the same way. This provides for a reduced impact of any process variations, which, in turn, provides for an improved manufacturing yield.

By the term "area" of the different coupling structures should be understood the lateral area in the plane of the sensing device. Typically, the different coupling structures (as well as the sensing structures) may be very thin, such as around 1 μm or less, and have areas of around 100 μm² or more.

For a suitable combination of common mode component suppression and amplification of the difference component, the area of the above-mentioned second feedback structure may advantageously be smaller than the area of the above-mentioned first feedback structure; and the area of the above-mentioned fourth feedback structure may advantageously be smaller than the area of the above-mentioned third feedback structure.

In particular, the area of the second feedback structure may advantageously be less than one half of the area of the first feedback structure; and the area of the fourth feedback structure may advantageously be less than one half of the area of the third feedback structure.

According to various embodiments, furthermore, the fingerprint sensing circuitry may additionally comprise excitation signal providing circuitry connected to the second input of each of the charge amplifiers and configured to change a potential at the second input from a first potential to a second potential, to thereby change a potential of the sensing structure, which in turn provides a change in potential difference between the finger and the sensing structure connected to the first input.

The excitation signal providing circuitry could be switching circuitry configured to switch between two or more different potentials provided on different lines. Alternatively or in combination, the excitation signal providing circuitry may comprise at least one signal source configured to provide a time-varying potential, such as a square wave voltage signal or a sine wave voltage signal.

Furthermore, according to various embodiments, the charge sensing circuitry comprised in the fingerprint sensing device may advantageously include a plurality of sets of charge amplifiers, each comprising the above-mentioned first charge amplifier and second charge amplifier. The first input of each charge amplifier may be connected to a corresponding sensing structure.

The fingerprint sensing device according to various embodiments of the present invention may, moreover, advantageously be comprised in an electronic device further comprising processing circuitry configured to: acquire the representation of the fingerprint pattern from the fingerprint sensing device; authenticate a user based on the representation; and perform at least one user-requested process only if the user is authenticated based on the representation. The electronic device may, for example, be a handheld communication device, such as a mobile phone or a tablet, a computer, or an electronic wearable item such as a watch or similar.

According to a second aspect of the present invention, there is provided a method of sensing a fingerprint pattern of a finger using a fingerprint sensing device comprising: a plurality of electrically conductive sensing structures including at least a first sensing structure and a second sensing structure; and charge sensing circuitry connected to the sensing structures, the charge sensing circuitry including at least a first charge amplifier and a second charge amplifier, each comprising: a first input; a second input; an output; and at least one amplifier stage between the first and second inputs, and the output, the output being capacitively coupled to the first input, wherein the method comprises the steps of: providing a capacitive coupling between the output of the first charge amplifier and the first input of the second charge amplifier; providing a capacitive coupling between the output of the second charge amplifier and the first input of the first charge amplifier; sampling outputs of the first and second charge amplifiers to form a representation of the fingerprint pattern.

Further embodiments of, and effects obtained through this second aspect of the present invention are largely analogous to those described above for the first aspect of the invention.

In summary, the present invention relates to a fingerprint sensing device for sensing a fingerprint pattern of a finger, the fingerprint sensing device comprising at least a first sensing structure and a second sensing structure; and at least a first charge amplifier and a second charge amplifier. Each charge amplifier comprises: a first input; a second input; an output; and at least one amplifier stage between the first and second inputs, and the output. The output is capacitively coupled to the first input. The first input of the first charge amplifier is connected to the first sensing structure; the first input of the second charge amplifier is connected to the second sensing structure; and the output of the first charge amplifier is capacitively coupled to the first input of the second charge amplifier to suppress the common mode component.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing device and method according to the present invention are mainly described with reference to a fingerprint sensing device in which two charge amplifiers associated with different sensing structures are capacitively cross-coupled to each other to suppress the common mode component of the capacitive coupling between finger and sensing structures. Furthermore, the feedback in the charge amplifiers has been shown to be realized with separate feedback structures that are both spaced apart from the sensing structure by a dielectric layer. Moreover, the fingerprint sensing device is illustrated as a touch sensor dimensioned and configured to acquire a fingerprint representation from a stationary finger.

It should be noted that this by no means limits the scope of the present invention, which equally well includes, for example, a fingerprint sensing device in which more than two charge amplifiers with different sensing structures are capacitively cross-coupled to each other. Also, feedback in the cross-coupled charge amplifiers may be realized with a single feedback structure spaced apart from the sensing structure by the dielectric layer. Other sensor array configurations, such as a so-called swipe sensor (or line sensor) for acquiring a fingerprint representation from a moving finger, are also within the scope of the present invention as defined by the appended claims.

Figure 1:
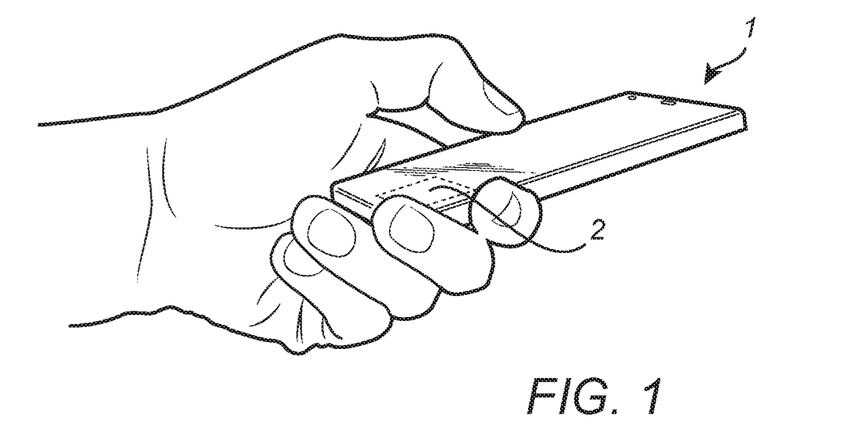
FIG. 1 schematically illustrates an application for a fingerprint sensing device according to an example embodiment of the present invention.

FIG. 1 schematically illustrates an application for a fingerprint sensing device according to an example embodiment of the present invention, in the form of a mobile phone 1 with an integrated fingerprint sensing device 2. The fingerprint sensing device 2 may, for example, be used for unlocking the mobile phone 1 and/or for authorizing transactions carried out using the mobile phone, etc.

Figure 2:
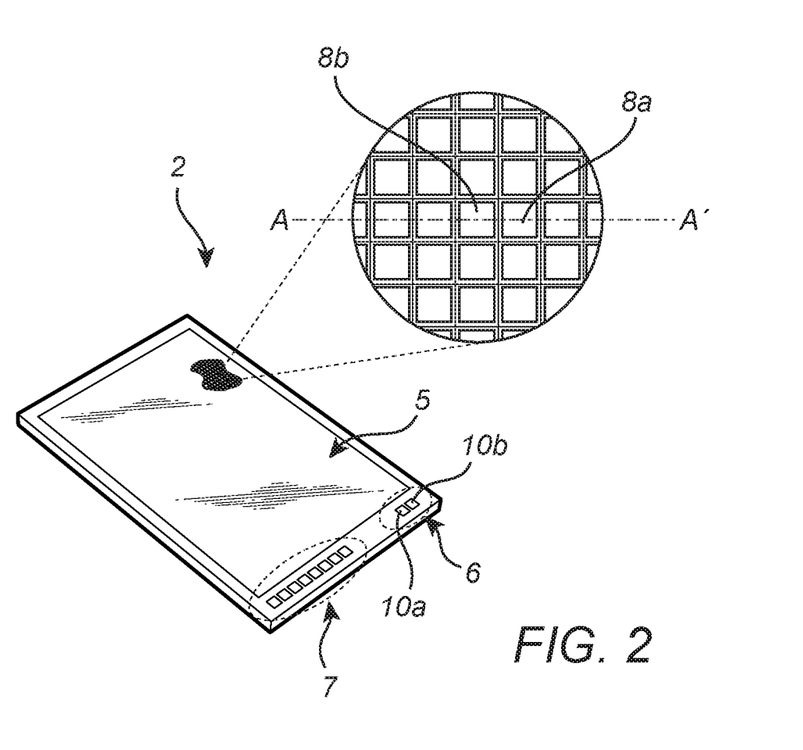
FIG. 2 schematically shows the fingerprint sensing device in FIG. 1.

FIG. 2 schematically shows the fingerprint sensing device 2 comprised in the mobile phone 1 in FIG. 1. As can be seen in FIG. 2, the fingerprint sensing device 2 comprises a sensor array 5, a power supply interface 6 and a communication interface 7. The sensor array 5 comprises a large number of sensing elements 8a-b (only two of the sensing elements have been indicated with a reference numeral to avoid cluttering the drawing), each being controllable to sense a distance between a sensing structure comprised in the sensing element 8a-b and the surface of a finger contacting the top surface of the sensor array 5.

The power supply interface 6 comprises first 10a and second 10b contact pads, here shown as bond pads, for connection of a supply voltage $V_{supply}$ to the fingerprint sensor 2.

The communication interface 7 comprises a number of bond pads for allowing control of the fingerprint sensor 2 and for acquisition of fingerprint data from the fingerprint sensor 2.

Figure 3:
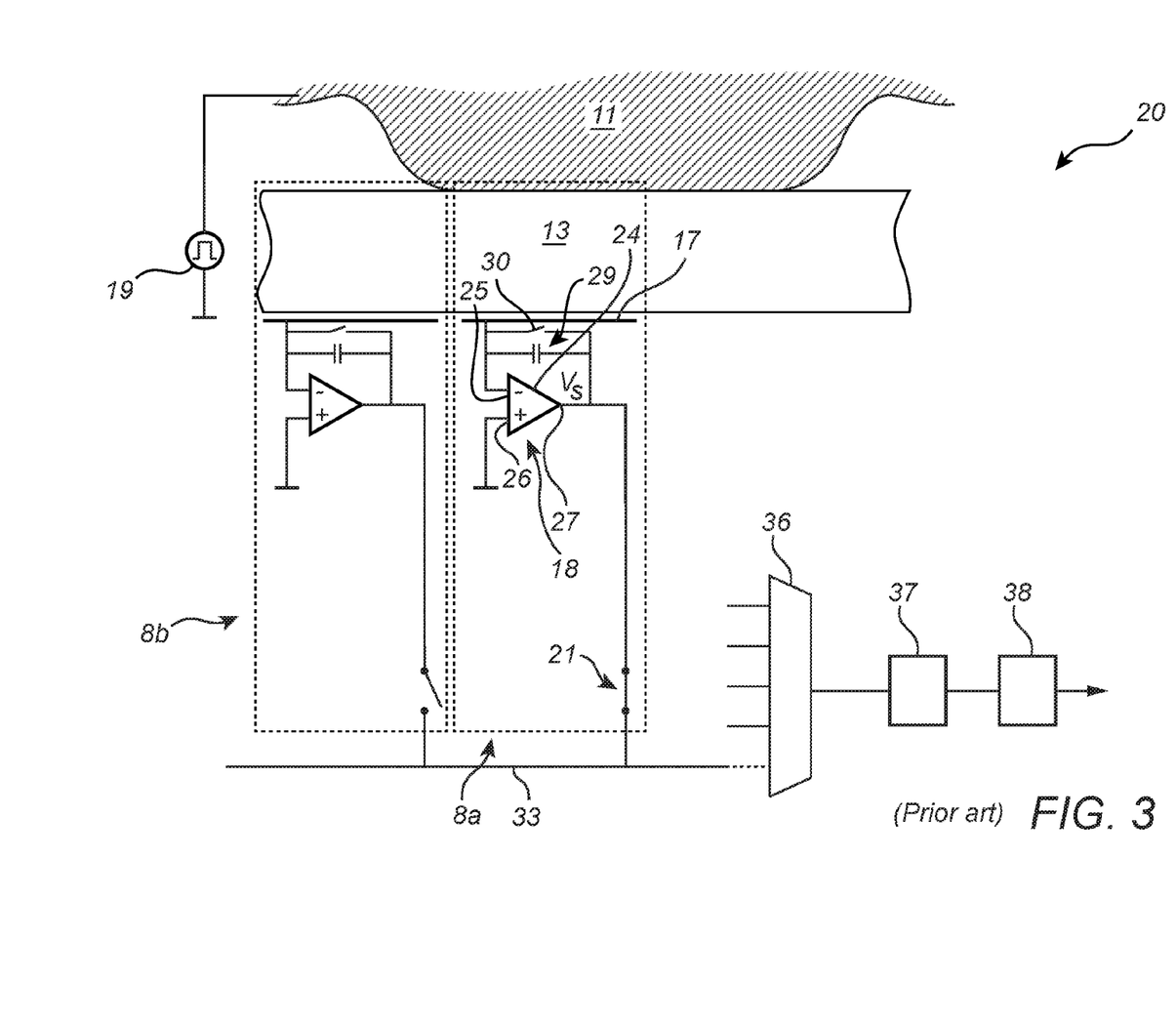
FIG. 3 is a schematic cross-section view of a portion of a fingerprint sensing device according to the prior art with a very thick protective coating.

FIG. 3 is a schematic cross section of a portion of a fingerprint sensing device 20 according to the prior art taken along the line A-A' as indicated in FIG. 2 with a finger 11 placed on top of the sensor array 5. Referring to FIG. 3, the fingerprint sensing device 20 comprises an excitation signal providing circuitry 19 electrically connected to the finger via a conductive finger drive structure (not shown in FIG. 3), and a plurality of sensing elements 8a-b, each comprising a protective dielectric top layer 13, a conductive sensing structure, here in the form of a metal plate 17 underneath the protective dielectric top layer 13, a charge amplifier 18, and selection circuitry, here functionally illustrated as a simple selection switch 21 for allowing selection/activation of the sensing elements 8a-b.

It should be noted that one sensing element 8a is illustrated as being located below a fingerprint ridge and another sensing element 8b is illustrated as being located below a fingerprint valley.

The charge amplifier 18 comprises at least one amplifier stage, here schematically illustrated as an operational amplifier (op amp) 24 having a first input (negative input) 25 connected to the sensing structure 17, a second input (positive input) 26 connected to sensor ground or another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 3, the first input 25 of the charge amplifier is virtually grounded.

When a time-varying potential is provided to the finger 11 by the excitation signal providing circuitry 19, a corresponding time-varying potential difference occurs between the sensing structure 17 and the finger 11.

The above-described change in potential difference between the finger 11 and the reference structure 17 results in a sensing voltage signal $V_s$ on the output 27 of the charge amplifier 18.

When a sensing element 8a is selected for sensing, the selection switch 21 is closed to provide the sensing signal to the readout line 33. The readout line 33, which may be a common readout line for a row or a column of the sensor array 5 in FIG. 2, is shown in FIG. 3 to be connected to a multiplexer 36. As is schematically indicated in FIG. 3, additional readout lines from other rows/columns of the sensor array 5 are also connected to the multiplexer 36.

The output of the multiplexer 36 is connected to a sample-and-hold circuit 37 and an analog-to-digital converter 38 in series for sampling and converting the analog signals originating from the sensing elements 8a-b to a digital representation of the fingerprint pattern of the finger 11 on the sensor 2.

Due to the very thick protective coating 13 covering the sensing structures 17 in FIG. 3, the capacitive coupling between different parts of the finger surface and underlying sensing structures 17 will consist of a relatively large common mode component and a relatively small difference component. This will be described further below with reference to the diagrams in FIGS. 4A-B.

Figure 4A:
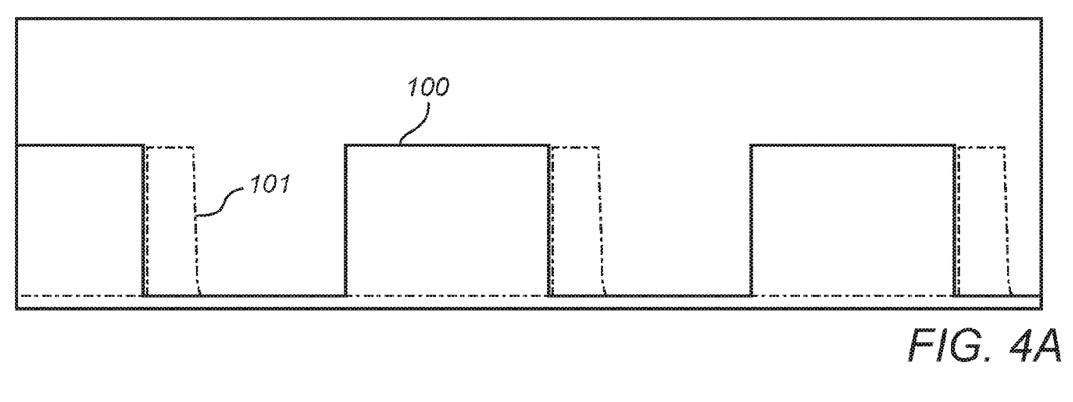
FIGS. 4A-B are diagrams schematically illustrating the output of the fingerprint sensing device in FIG. 3.

FIG. 4A is a diagram including a first graph 100 representing the excitation signal provided by the excitation signal providing circuitry 19 in FIG. 3 for achieving the desired potential difference between the finger 11 and the sensing structures 17, and a second graph 101 representing the reset signal used for controlling the reset switch 30 in FIG. 3.

Figure 4B:
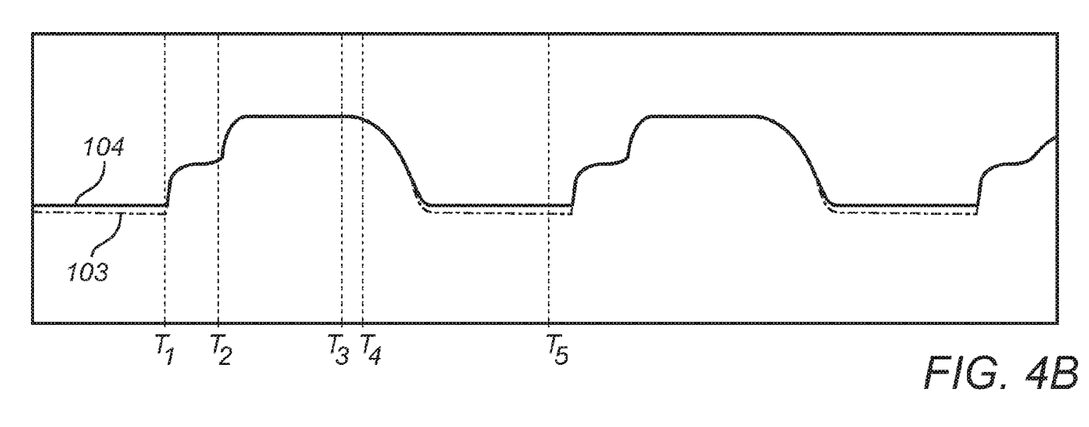

FIG. 4B is a diagram including a first graph 103 representing a sensing signal output from the charge amplifier in the first sensing element 8a in FIG. 3, and a second graph 104 representing a sensing signal output from the charge amplifier in the second sensing element 8b in FIG. 3.

Starting at the time $T_1$, the feedback capacitors 29 are reset by operating the switch 30. The switch 30 is opened again at the time $T_2$, resulting in a small charge injection. Due to the charge injection, there is a change of the sensing voltage levels at the time $T_2$.

At the time $T_3$, the sensing signals of the sensing elements 8a-b are sampled a first time by the sample-and-hold circuitry 37, resulting in a first sampled value for each sensing element 8a-b.

Subsequently, at the time $T_4$, the drive signal (graph 100 in FIG. 4A) goes from a relatively low potential to a relatively high potential. This results in a change in the potential difference between the finger 11 and the sensing structures 17, which in turn results in a change in the charge on the sensing structures 17 resulting from capacitive coupling with the finger 11. This change in charge is translated into a change in the voltages provided by the charge amplifiers of the sensing elements 8a-b.

When the sensing voltage signal $V_s$ has stabilized, at the time $T_5$, the sensing signals are sampled a second time by the sample-and-hold circuitry 37, resulting in a second sampled value for each sensing element 8a-b.

For each of the sensing elements 8a-b, the difference between the first and second sampled values is a measure indicative of the capacitive coupling between the respective sensing plates and the finger. This difference is, for each sensing element 8a-b, provided to the ADC 38 to be digitized and output as, for instance, a pixel value in a fingerprint pattern representation.

As can be seen in FIG. 4B, the difference between the first and second sampled values, and hence the pixel value, will be almost the same for the sensing element 8a below the fingerprint ridge and the sensing element 8b below the fingerprint valley. In other words, the common mode component $V_{cm}$ is considerably larger than the difference component $V_d$, which carries all the available information about the fingerprint pattern.

In particular for fingers exhibiting a poor contrast, such as dry fingers, the very small difference component $V_d$ in relation to the common mode component $V_{cm}$ may result in fingerprint images which are not good enough to provide a satisfactory biometric performance.

To improve this situation, embodiments of the present invention provide for suppression of the common mode component, and allow for increased amplification of the difference component.

Figure 5:
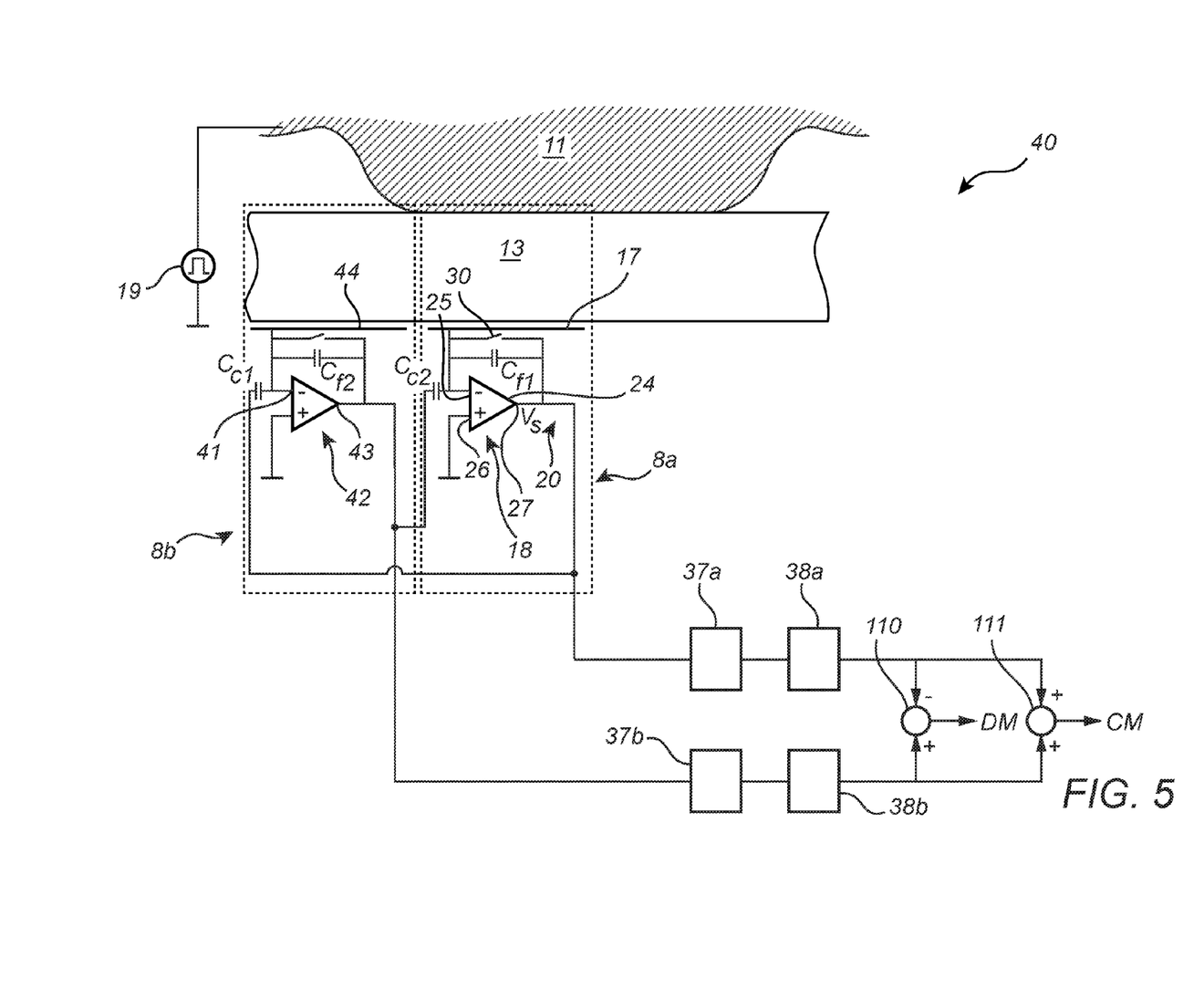
FIG. 5 is a schematic cross-section view of a portion of a fingerprint sensing device according to a first embodiment of the present invention with a very thick protective coating.

FIG. 5 is a schematic cross section of a portion of a fingerprint sensing device 40 according to a first embodiment of the present invention along the line A-A' as indicated in FIG. 2 with a finger 11 placed on top of the sensor array 5. Referring to FIG. 5, the fingerprint sensing device 40 in FIG. 5 mainly differs from the fingerprint sensing device 20 in FIG. 3 in that output 27 of the first charge amplifier 18 is capacitively coupled to the first input 41 of the second charge amplifier 42 and in that the output 43 of the second charge amplifier 42 is capacitively coupled to the first input 25 of the first charge amplifier 18. As a result of this symmetric capacitive cross-coupling of the first 18 and second 42 charge amplifiers, the common mode component of the capacitive coupling between the finger 11 and the first 17 and second 44 sensing structures, respectively, is suppressed. This means that the difference component can be amplified more without saturating the first 18 and second 42 charge amplifiers. A further difference between the fingerprint sensing device 40 in FIG. 5 and the prior art fingerprint sensing device 20 in FIG. 3 is that the sensing signals output by the charge amplifier 18 of the first sensing element 8a and the charge amplifier 42 of the second sensing element 8b are provided in parallel to different sample and hold circuits 37a-b, and analog to digital converters 38a-b. The fingerprint sensing device 40 further comprises difference circuitry 110 for providing a digital differential mode output DM, and summing circuitry 111 for providing a digital common mode output CM. It should be understood that suitable difference circuitry and summing circuitry may equally well be arranged before the sample and hold circuits 37a-b or between the sample and hold circuits 37a-b and the analog to digital converters 38a-b.

Referring again to FIG. 5, the capacitive coupling between the output 27 and the first input 25 of the first charge amplifier 18 is represented by a first feedback capacitance $C_{f1}$, the capacitive coupling between the output 43 and the first input 41 of the second charge amplifier 42 is represented by a second feedback capacitance $C_{f2}$, the capacitive coupling between the output 27 of the first charge amplifier 18 and the first input 41 of the second charge amplifier 42 is represented by a first cross-coupling capacitance $C_{c1}$, and the capacitive coupling between the output 43 of the second charge amplifier 42 and the first input 25 of the first charge amplifier 18 is represented by a second cross-coupling capacitance $C_{c2}$.

For the desired suppression of the common mode component and a uniform behavior of the different charge amplifiers in the charge sensing circuitry of the fingerprint sensing device 40, the first feedback capacitance $C_{f1}$ and the second feedback capacitance $C_{f2}$ may advantageously be substantially identical, and the first cross-coupling capacitance $C_{c1}$ and the second cross-coupling capacitance $C_{c2}$ may advantageously be substantially identical. Furthermore, the first feedback capacitance $C_{f1}$ (second feedback capacitance $C_{f2}$) should be greater than the second cross-coupling capacitance $C_{c2}$ (first cross-coupling capacitance $C_{c1}$). As an illustrative example, the first feedback capacitance $C_{f1}$ (second feedback capacitance $C_{f2}$) may be around 3 fF, and the second cross-coupling capacitance $C_{c2}$ (first cross-coupling capacitance $C_{c1}$) may be around 2.5 fF.

Figure 6A:
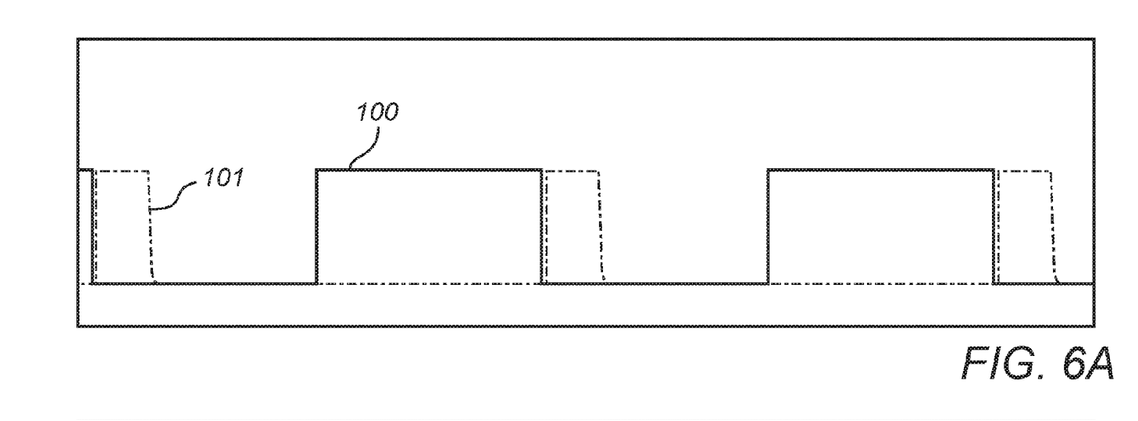
FIGS. 6A-B are diagrams schematically illustrating the output of the fingerprint sensing device in FIG. 5.
Figure 6B:
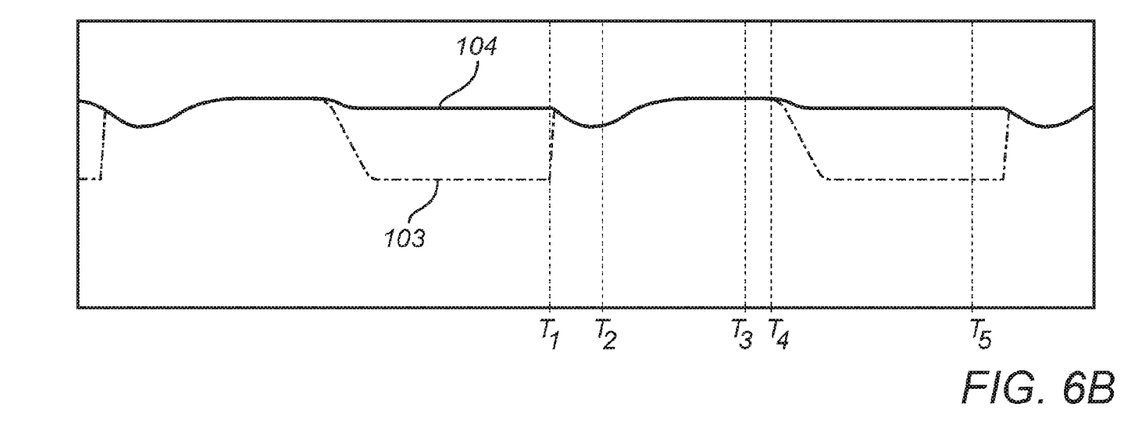

The difference in result between the prior art solution of FIG. 3 and embodiments of the present invention becomes clear by comparing the diagrams in FIGS. 6A-B with those in FIGS. 4A-B.

As can be seen in FIG. 6B, the common mode component $V_{cm}$ has been suppressed, and the difference component $V_d$ has been amplified.

It is easy to understand that output signals like those in FIG. 6B will provide considerably more fingerprint pattern information than output signals like those in FIG. 4B.

Figure 7:
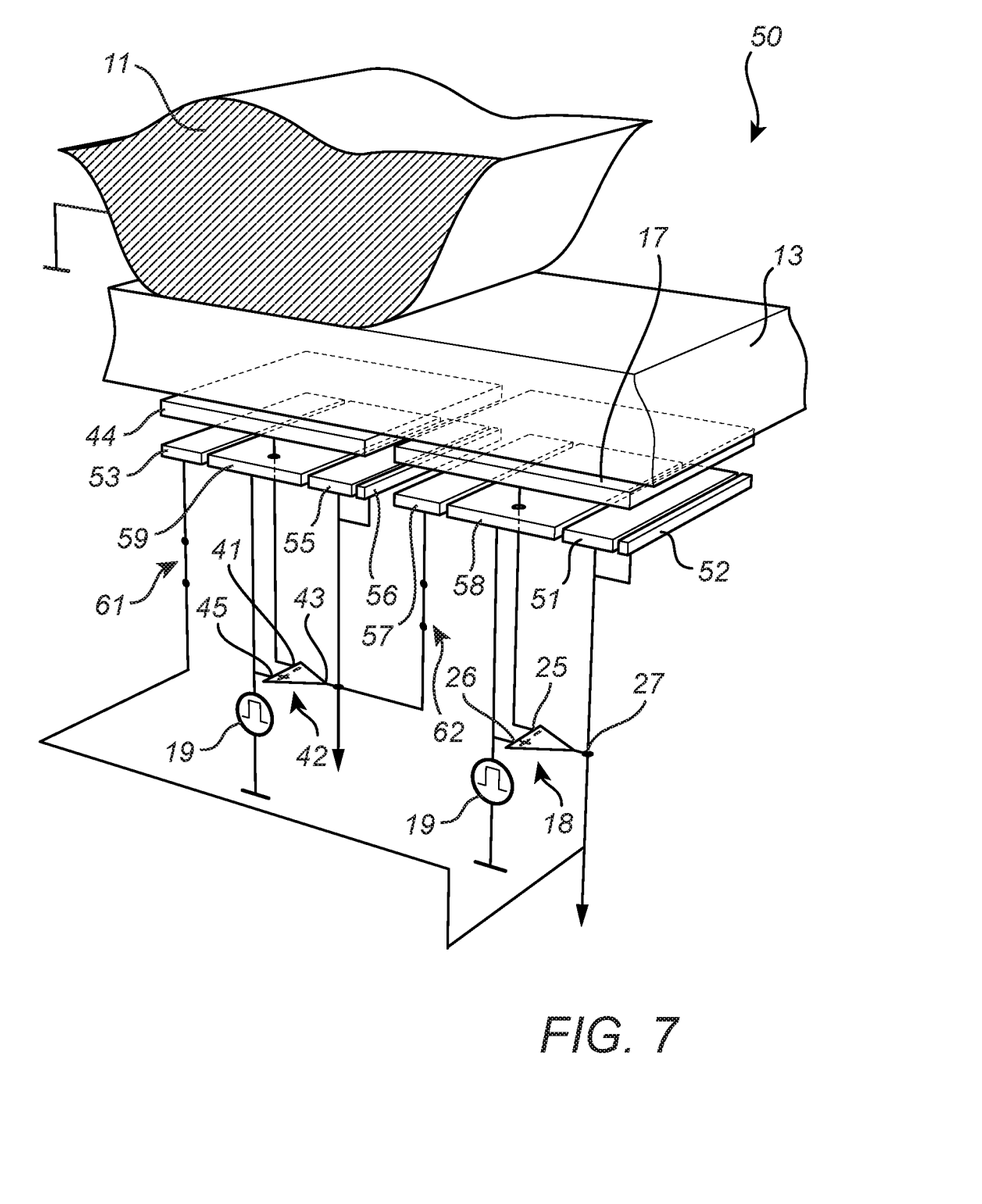
FIG. 7 is a hybrid of a partly structural and partly circuit schematic illustration of a portion of a fingerprint sensing device according to a second embodiment of the present invention.

A second embodiment of the fingerprint sensing device 50 according to the present invention will now be described with reference to FIG. 7, which is a hybrid of a partly structural and partly circuit schematic illustration of a portion of the fingerprint sensing device 50. In FIG. 7, the finger 11, the protective dielectric material 13, sensing plates and coupling plates are schematically shown in an exploded perspective view, while the charge amplifiers are illustrated using high level circuit schematics.

Apart from being illustrated with a different level of detail, the fingerprint sensing device 50 in FIG. 7 differs from the fingerprint sensing device 40 in FIG. 5 in that the desired potential difference between the finger 11 and the first 17 and second 44 sensing structures is achieved by coupling an excitation signal source (collectively denoted by the reference numeral 19) to the second input 26 of the first charge amplifier 18 and to the second input 45 of the second charge amplifier 42. Furthermore, switches are included for allowing the fingerprint sensing device 50 to be controlled between a 'CM-suppression' mode and a 'normal' mode as was described in the Summary section further above.

The finger 11 is schematically indicated as being "grounded" in FIG. 7. It should be understood that the finger "ground" may be different from the sensor ground. For instance, the finger may be at the ground potential of the electronic device in which the capacitive fingerprint sensing device is included. Alternatively, the body may be considered to have such a large electrical "mass" that the potential of the finger remains substantially constant when the potential of the first 17 and/or second 44 sensing structure varies.

As is schematically shown in FIG. 7, the output 27 of the first charge amplifier 18 is connected to a first feedback structure (plate) 51, a second feedback structure (plate) 52, and a first charge amplifier output coupling structure (plate) 53. In the same way, the output 43 of the second charge amplifier 42 is connected to a third feedback structure (plate) 55, a fourth feedback structure (plate) 56, and a second charge amplifier output coupling structure (plate) 57. The remaining space under the first sensing plate 17 is occupied by a first shielding plate 58, and the remaining space under the second sensing plate 44 is occupied by a second shielding plate 59.

Briefly referring to the first embodiment of the fingerprint sensing device 40 described above with reference to FIG. 5, precise control of at least the relations between the first $C_{f1}$ and second $C_{f2}$ feedback capacitances, and the first $C_{c1}$ and second $C_{c2}$ cross-coupling capacitors is important to the uniformity of the common mode component suppression in the fingerprint sensing device.

Referring again to the second embodiment of the fingerprint sensing device 50 in FIG. 7, the first feedback capacitance $C_{f1}$ is realized by the first 51 and second 52 feedback plates, the second feedback capacitance $C_{f2}$ is realized by the third 55 and fourth 56 feedback plates, the first cross-coupling capacitance $C_{c1}$ is realized by the first charge amplifier output plate 53, and the second cross-coupling capacitance $C_{c2}$ is realized by the second charge amplifier output plate 57.

To ensure that the desired relationship between feedback capacitance and cross-coupling capacitance is actually achieved more or less regardless of variations in the semiconductor process, the first feedback plate 51 is designed to have the same area (ideally the identical shape) as the second charge amplifier output plate 57, and the third feedback plate 55 is designed to have the same area (ideally the identical shape) as the first charge amplifier output plate 53. The desired difference between the first feedback capacitance $C_{f1}$ and the second cross-coupling capacitance $C_{c2}$ is achieved by the separate second feedback structure 52, and the desired difference between the second feedback capacitance $C_{f2}$ and the first cross-coupling capacitance $C_{c1}$ is achieved by the separate fourth feedback structure 56.

Furthermore, the fingerprint sensing device 50 in FIG. 7 comprises first switching circuitry, here schematically illustrated as a first switch 61 between the output 27 of the first charge amplifier 18 and the first charge amplifier output coupling structure (plate) 53, and second switching circuitry, here schematically illustrated as a second switch 62 between the output 43 of the second charge amplifier 42 and the second charge amplifier output coupling structure (plate) 57. In FIG. 7, the first switch 61 and the second switch 62 are closed so that the fingerprint sensing device 50 is in its 'CM-suppression' mode.

It should be noted that the different plates in FIG. 7 have simplified rectangular shapes to illustrate the above-described principle, and that it may be beneficial to use other shapes in reality.

One example of an alternative plate configuration will now be described with reference to FIG. 8, which is a schematic perspective top view of a fingerprint sensing device 80, only showing parts of the two top metal layers of a portion of the fingerprint sensing device 80.

Figure 8:
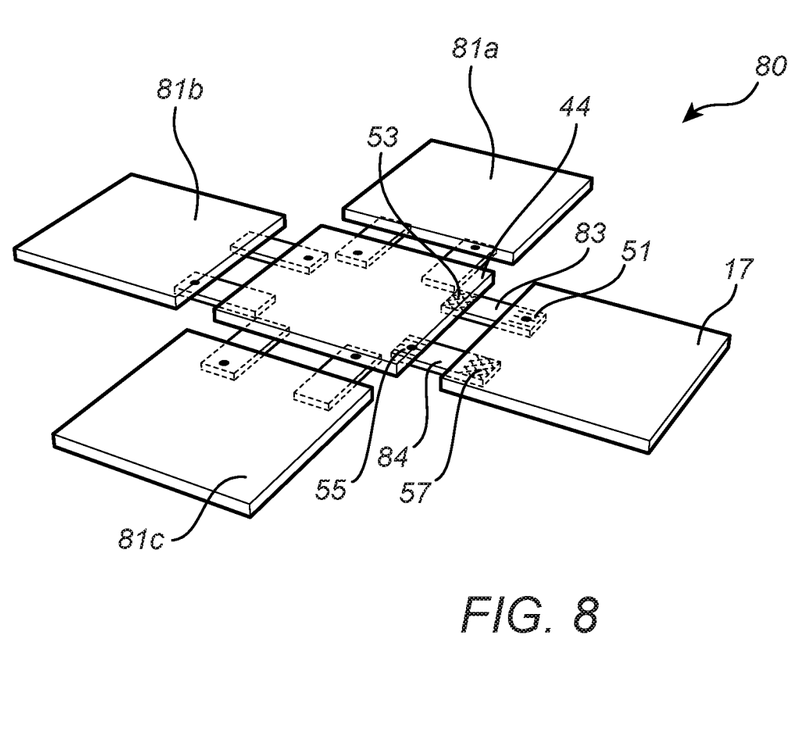
FIG. 8 schematically shows an alternative configuration of the feedback structures and the coupling structures in FIG. 7.

Referring to FIG. 8, additional sensing structures 81*a-c* have been shown to surround the second sensing structure 44. In this example, each charge amplifier is cross-coupled with its four closest neighbors. For instance, the second charge amplifier 42 is cross-coupled with the charge amplifier (not shown in FIG. 8) associated with the first sensing structure 17 as well as the charge amplifiers (not shown in FIG. 8) associated with the other sensing structures 81*a-c* surrounding the second sensing structure 44.

In the configuration illustrated in FIG. 8, conductive structures arranged below the sensing structures extend below neighboring sensing structures to fulfill dual functions (feedback and cross-coupling). This configuration provides for less patterning and may therefore facilitate manufacturing and increase production yield of the fingerprint sensing device 80.

As an illustrative example (and using reference numerals from FIG. 7), the first charge amplifier output coupling structure 53 and the first feedback structure 51 may be provided in the form of a first combined plate 83, and the second charge amplifier output coupling structure 57 and third feedback structure 55 may be provided in the form of a second combined plate 84.

Figure 9:
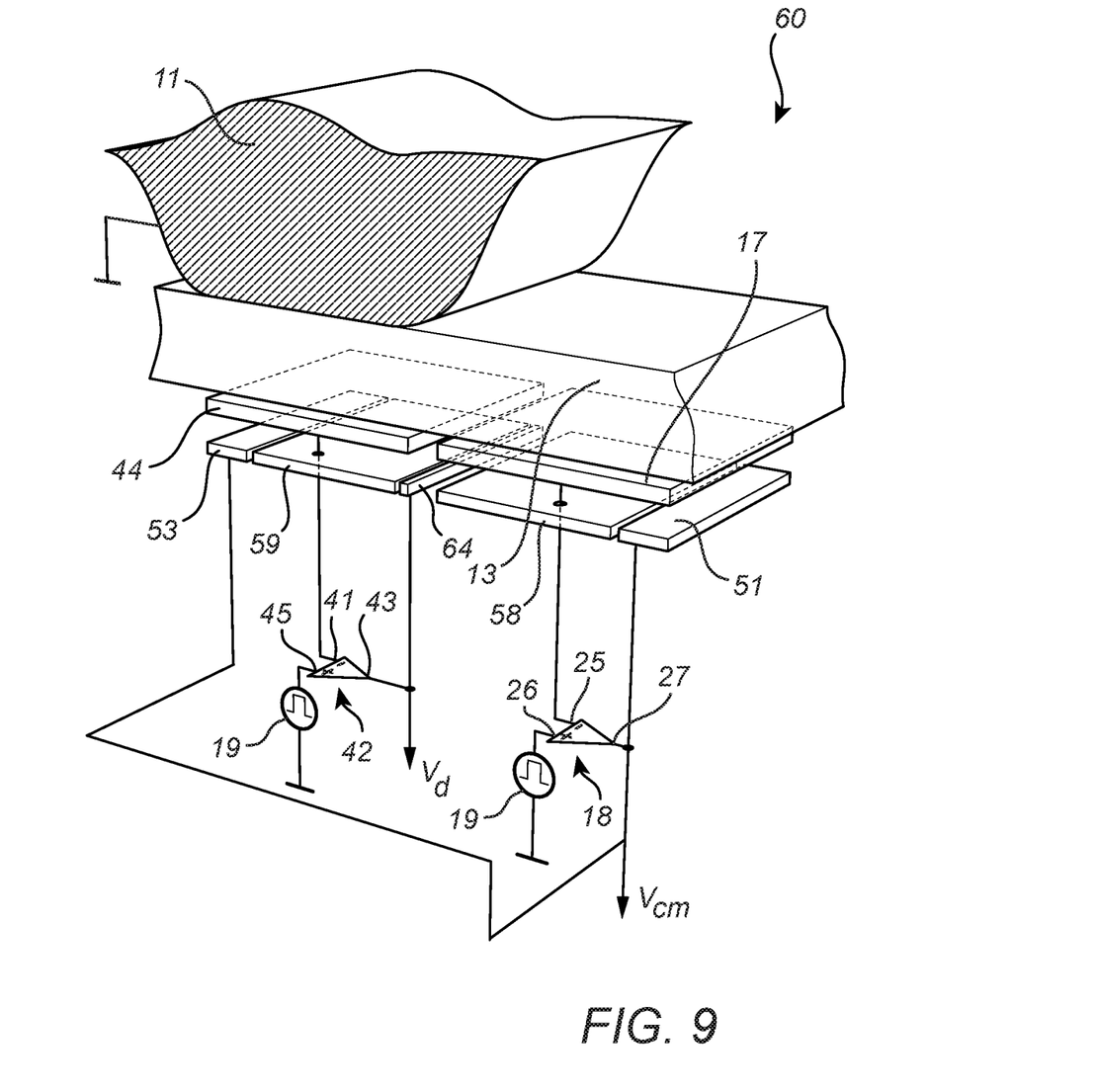
FIG. 9 is a hybrid of a partly structural and partly circuit schematic illustration of a portion of a fingerprint sensing device according to a third embodiment of the present invention.

So far, embodiments of the fingerprint sensing device according to the present invention with symmetric capacitive cross-coupling configurations have been described. With reference to FIG. 9, a third embodiment of the fingerprint sensing device, having an asymmetric cross-coupling configuration will be described in the following.

Referring to FIG. 9, the output 27 of the first charge amplifier 18 is capacitively coupled to the first input 41 of the second charge amplifier through the capacitor formed by the first charge amplifier output plate 53, the second sensing plate 44 and the dielectric arranged therebetween. In the fingerprint sensing device 60, the output 43 of the second charge amplifier 42 is not capacitively coupled to the first input 25 of the first charge amplifier 18. Furthermore, the first feedback plate 51 has been designed to be identical to the first charge amplifier output plate 53, while the feedback plate 64 capacitively coupling the output 43 of the second charge amplifier 42 to the first input 41 of the second charge amplifier 42 is considerably smaller than the first feedback plate 51 of the first charge amplifier 18.

In the fingerprint sensing device 60 of FIG. 9, the sensing voltage output by the first charge amplifier 18 will be indicative of the common mode component, while the sensing voltage output by the second charge amplifier 42 will be indicative of the difference component.

Figure 10:
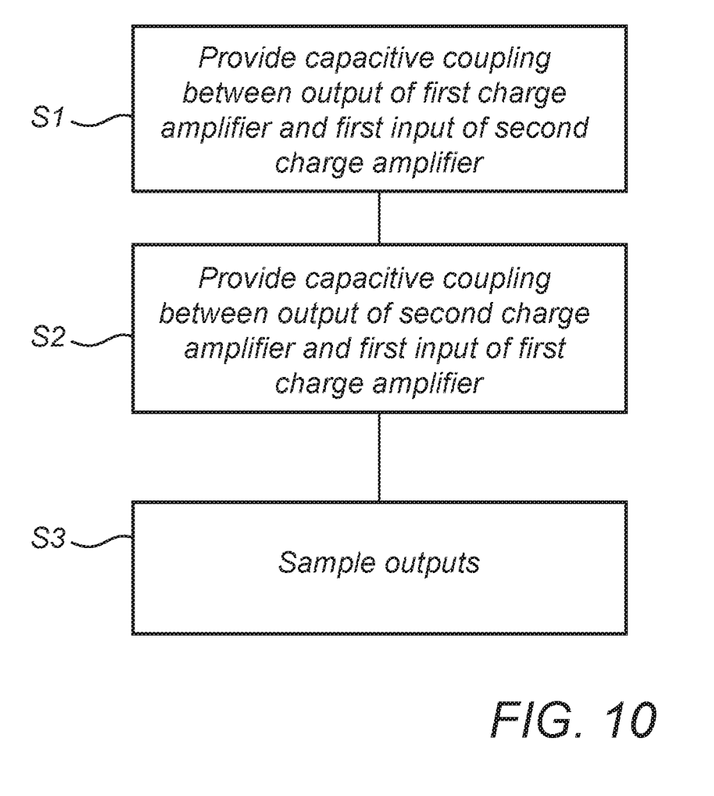
FIG. 10 is a flow-chart schematically illustrating an example embodiment of the method according to the present invention.

Finally, an embodiment of the method according to the present invention will be described with reference to the flow-chart in FIG. 10.

In a first step S1, there is provided a capacitive coupling between the output of the first charge amplifier and the first input of the second charge amplifier. In the subsequent step S2, there is provided a capacitive coupling between the output of the second charge amplifier and the first input of the first charge amplifier. Thereafter, in step S3, the outputs of the first and second charge amplifiers are sampled to form a representation of the fingerprint pattern.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A fingerprint sensing device for sensing a fingerprint pattern of a finger, said fingerprint sensing device comprising:
    a plurality of electrically conductive sensing structures including at least a first sensing structure and a second sensing structure; and
    charge sensing circuitry connected to said sensing structures, said charge sensing circuitry including a set of charge amplifiers comprising at least a first charge amplifier and a second charge amplifier, each comprising:
        a first input;
        a second input;
        an output; and
        at least one amplifier stage between said first and second inputs, and said output,
        said output being capacitively coupled to said first input,
    wherein:
        the first input of said first charge amplifier is connected to said first sensing structure;
        the first input of said second charge amplifier is connected to said second sensing structure; and
        the output of said first charge amplifier is capacitively coupled to the first input of said second charge amplifier,
        wherein the output of said second charge amplifier is capacitively coupled to the first input of said first charge amplifier.

2. The fingerprint sensing device according to claim 1, wherein:
    a capacitive coupling between the output of said second charge amplifier and the first input of said second charge amplifier is stronger than a capacitive coupling between the output of said first charge amplifier and the first input of said second charge amplifier; and
    a capacitive coupling between the output of said first charge amplifier and the first input of said first charge amplifier is stronger than a capacitive coupling between the output of said second charge amplifier and the first input of said first charge amplifier.

3. The fingerprint sensing device according to claim 2, wherein:
    said capacitive coupling between the output of said second charge amplifier and the first input of said second charge amplifier is less than two times stronger than said capacitive coupling between the output of said first charge amplifier and the first input of said second charge amplifier; and said capacitive coupling between the output of said first charge amplifier and the first input of said first charge amplifier is less than two times stronger than said capacitive coupling between the output of said second charge amplifier and the first input of said first charge amplifier.

4. The fingerprint sensing device according to claim 1, wherein:

the output of said first charge amplifier is capacitively coupled to the first input of said second charge amplifier by means of a conductive first charge amplifier output coupling structure directly conductively connected to the output of said first charge amplifier, a conductive second charge amplifier input coupling structure directly conductively connected to the first input of said second charge amplifier and a dielectric layer arranged between said first charge amplifier output coupling structure and said second charge amplifier input coupling structure; and the output of said second charge amplifier is capacitively coupled to the first input of said first charge amplifier by means of a conductive second charge amplifier output coupling structure directly conductively connected to the output of said second charge amplifier, a conductive first charge amplifier input coupling structure directly conductively connected to the first input of said first charge amplifier and a dielectric layer arranged between said second charge amplifier output coupling structure and said first charge amplifier input coupling structure.

5. The fingerprint sensing device according to claim 4, wherein:

said first charge amplifier input coupling structure is constituted by said first sensing structure; and said second charge amplifier input coupling structure is constituted by said second sensing structure.

6. The fingerprint sensing device according to claim 5, wherein:

the first input of said first charge amplifier is capacitively coupled to the output of said first charge amplifier by means of:
  a conductive first feedback structure directly conductively connected to the output of said first charge amplifier, said first sensing structure, and a dielectric layer arranged between said first feedback structure and said first sensing structure; and
  a conductive second feedback structure directly conductively connected to the output of said first charge amplifier, said first sensing structure, and a dielectric layer arranged between said second feedback structure and said first sensing structure; and the first input of said second charge amplifier is capacitively coupled to the output of said second charge amplifier by means of:
  a conductive third feedback structure directly conductively connected to the output of said second charge amplifier, said second sensing structure, and a dielectric layer arranged between said third feedback structure and said second sensing structure; and
  a conductive fourth feedback structure directly conductively connected to the output of said second charge amplifier, said second sensing structure, and a dielectric layer arranged between said fourth feedback structure and said second sensing structure.

7. The fingerprint sensing device according to claim 6, wherein:

said second feedback structure and said first charge amplifier output coupling structure are formed by first conductive structure extending partly below said first sensing structure and partly below said second sensing structure; and said fourth feedback structure and said second charge amplifier output coupling structure are formed by a second conductive structure extending partly below said first sensing structure and partly below said second sensing structure.

8. The fingerprint sensing device according to claim 6, wherein:

an area of said first charge amplifier output coupling structure is substantially identical to an area of said third feedback structure; and an area of said second charge amplifier output coupling structure is substantially identical to an area of said first feedback structure.

9. The fingerprint sensing device according to claim 8, wherein:

an area of said second feedback structure is smaller than the area of said first feedback structure; and an area of said fourth feedback structure is smaller than the area of said third feedback structure.

10. The fingerprint sensing device according to claim 9, wherein:

the area of said second feedback structure is less than one half of the area of said first feedback structure; and the area of said fourth feedback structure is less than one half of the area of said third feedback structure.

11. The fingerprint sensing device according to claim 1, wherein each of said charge amplifiers is configured in such a way that a potential at said first input follows a potential at said second input.

12. The fingerprint sensing device according to claim 11, wherein said fingerprint sensing device further comprises:

excitation signal providing circuitry connected to said second input of each of said charge amplifiers and configured to change a potential at said second input from a first potential to a second potential, to thereby change a potential of said sensing structure, thereby providing a change in potential difference between said finger and said sensing structure connected to said first input.

13. The fingerprint sensing circuitry according to any claim 1, wherein said charge sensing circuitry comprises a plurality of sets of charge amplifiers, each including at least a first charge amplifier and a second charge amplifier, each comprising:

a first input;
a second input;
an output; and
at least one amplifier stage between said first and second inputs, and said output,
said output being capacitively coupled to said first input, wherein:
  the first input of said first charge amplifier is connected to said first sensing structure for sensing a charge carried by said first sensing structure;
  the first input of said second charge amplifier is connected to said second sensing structure for sensing a charge carried by said second sensing structure; and the output of said first charge amplifier is capacitively coupled to the first input of said second charge amplifier.

14. An electronic device comprising:
the fingerprint sensing device according to claim 1; and
processing circuitry configured to:
acquire a representation of said fingerprint pattern from the fingerprint sensing device;
authenticate a user based on said representation; and
perform at least one user-requested process only if said user is authenticated based on said representation.

15. A method of sensing a fingerprint pattern of a finger using a fingerprint sensing device comprising:
a plurality of electrically conductive sensing structures including at least a first sensing structure and a second sensing structure; and
charge sensing circuitry connected to said sensing structures, said charge sensing circuitry including at least a first charge amplifier and a second charge amplifier, each comprising:
a first input;
a second input;
an output; and
at least one amplifier stage between said first and second inputs, and said output,
said output being capacitively coupled to said first input,
wherein said method comprises the steps of:
providing a capacitive coupling between the output of the first charge amplifier and the first input of the second charge amplifier;
providing a capacitive coupling between the output of the second charge amplifier and the first input of the first charge amplifier;
sampling outputs of said first and second charge amplifiers to form a representation of said fingerprint pattern.

* * * * *